United States Patent [19]

Runyan et al.

[11] Patent Number: 5,055,143

[45] Date of Patent: Oct. 8, 1991

[54] RE-ENTRANT ANGLE CLOSURE ON SUPERPLASTICALLY FORMED STRUCTURE

[75] Inventors: Max R. Runyan, Huntington Beach; Carolyn Salmon, Long Beach; Scott D. Silliman, Huntington Beach, all of Calif.

[73] Assignee: McDonnell Douglas Corporation, Long Beach, Calif.

[21] Appl. No.: 498,557

[22] Filed: Mar. 26, 1990

[51] Int. Cl.$^5$ .......................... C22F 1/18; B21D 22/26
[52] U.S. Cl. ........................... 148/11.5 R; 148/11.5 F; 156/79; 228/157; 228/193; 420/902; 428/178; 428/593; 428/594
[58] Field of Search .................. 428/593, 594, 178; 148/11.5 R, 11.5 F; 228/157, 193; 420/902; 156/79

[56] References Cited

U.S. PATENT DOCUMENTS 4,304,821  12/1981  Hayase et al. ..................... 428/593

*Primary Examiner*—R. Dean
*Assistant Examiner*—Robert R. Koehler
*Attorney, Agent, or Firm*—Paul T. Loef; Gregory A. Cone; John P. Scholl

[57] ABSTRACT

A superplastically formed and diffusion bonded structure formed with two or more sheets and upset forging the material at the perimeter to provide the expulsive material between the inner most sheets so as to close the entrance angle formed between the expanded sheets at the line where the surfaces of the split forming fixture engage and the method of producing this structure. The upset forged material insures the structural integrity of the outside perimeter structure after removal of the flange which is normally present as a result of the holding fixture.

13 Claims, 2 Drawing Sheets

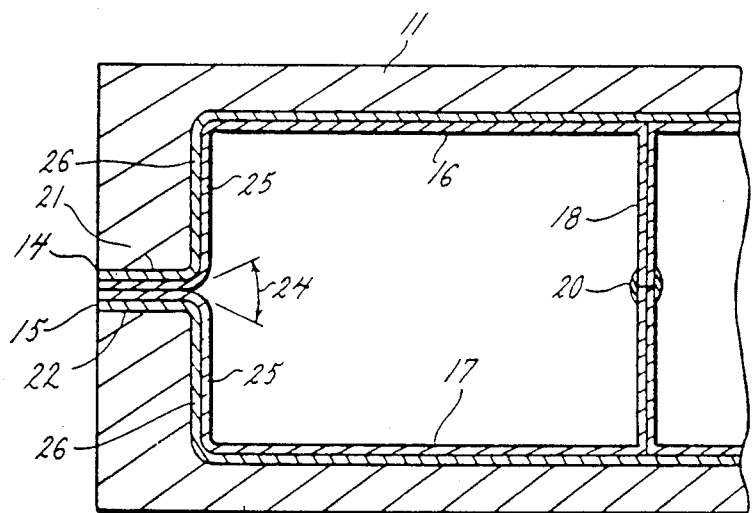
FIG. 1.
(PRIOR ART)
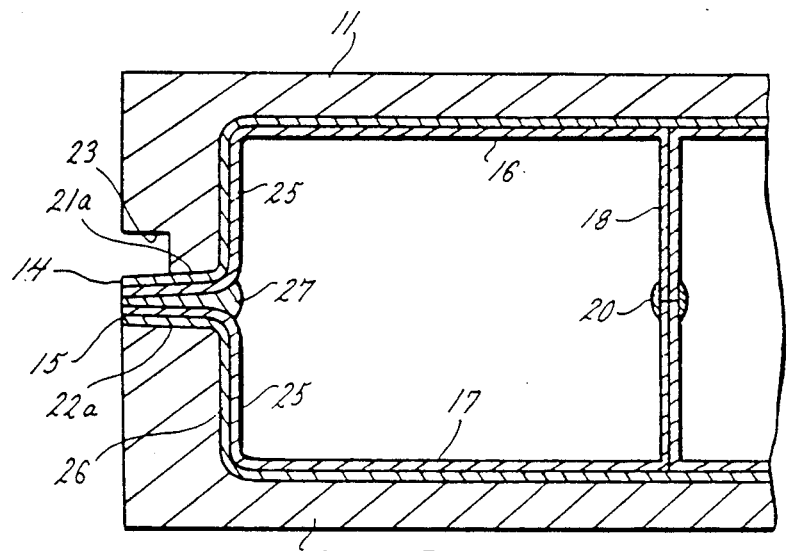
FIG. 2.
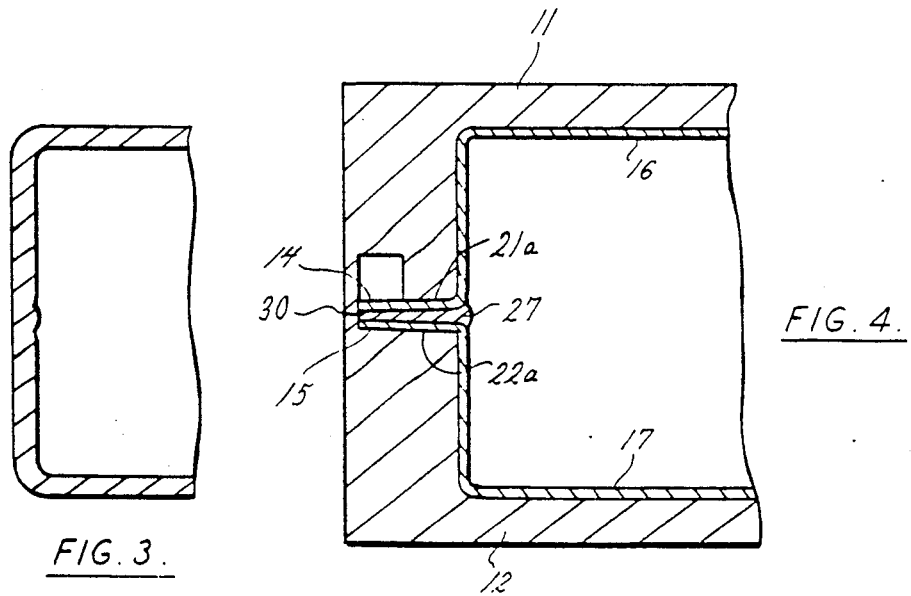
FIG. 3.
FIG. 4.

RE-ENTRANT ANGLE CLOSURE ON SUPERPLASTICALLY FORMED STRUCTURE

BACKGROUND OF THE INVENTION

This invention pertains to an improvement in the production of superplastically formed, diffusion bonded, metal alloy structures, and more particularly, to providing uninterrupted wall thickness at the re-entrant angle that occurs in the structure at the parting line between the two halves of the forming fixture.

Combined superplastic formed and diffusion bonded (SPF/DB) structures are now state of the art in production technologies in the aerospace world. Superplasticity may be defined as the property of some materials to develop unusually high tensile elongations with minimum necking.

Currently two different methods and structures of forming SPF/DB sandwich structures are popular. The first process was pioneered by C. H. Hamilton as taught in U.S. Pat. No. 3,927,817 and the second is an improved structure and process as taught by Hayase et al in U.S. Pat. Nos. 4,217,397 and 4,304,821, both of which are incorporated herein by reference. Both of these popular methods use a split forming die. The sheets to be superplastically formed are held between the two halves of the forming die so as to produce a completed part that has a flange around the perimeter. In the normal case the sheets being formed into both core sheets and face sheets are diffusion bonded by mechanical die pressure at the perimeter flange as a result of the process.

Inherent in the superplastic forming process is some variation in the wall thickness of the finished part which occurs for two reasons. One, strain is proportional to the stress and the part being formed is not uniformly stressed so it is not uniformly strained and two, when the sheet being formed contacts either the mold or another sheet being formed further strain at that point is inhibited because it immediately diffusion bonds and further deformation is restricted to the free region of the sheet. As shown in the section of FIG. 1, Prior Art, the radius of the corners of the fixture that the sheets are formed around needs to be reasonably generous to avoid too much thinning of the wall and as a result there is an entrance angle formed between the two inner sheets where they enter the flanged angle. Typically, as shown, that entrance angle is such that if it is necessary to cut the flange off of the formed part in order to complete the finished part you actually have an open space in the outer wall. This problem can be minimized by very precise control of the welds on the outer perimeter of the sheets to be formed in relationship to the forming die or the inside sheets can actually be folded over on themselves at the approximate location of this entrance angle so as to provide extra material. However, both of these methods are time consuming, expensive, and require precise placement of the part to the die.

It is an object of this invention to fill the void created at this entrance angle so that when the flange is removed there is a solid outer wall and to accomplish this during the forming operation and to do it economically.

SUMMARY OF THE INVENTION

The above objects are accomplished in a process of superplastically forming and diffusion bonding where two or more sheets are retained between engaging portions of a split forming fixture for expansion away from each other by the insertion of a doubler between any two sheets along with the application of pressure between the engaging portions of the forming fixture. The material between the engaging portions of the fixture is upset forged as a result of the forging pressure and the doubler provides the material to close the entrance angle formed between the two inner most sheets when expanded. What is critical is that sufficient pressure is applied to actually forge the material and that there is sufficient material to fill the void when the die halves are against the stops. Usually material must be added in the form of a doubler. Alternate embodiments include tapering the doubler or at least one engaging surface of the forming fixture is canted so as to force the forged material into the entrance angle formed between the two inner most sheets.

Alternately, and briefly, in structural terms as opposed to method or process terms, an SPF/DB structure is formed with two or more sheets having upset forged material between the inner most sheets so as to close the entrance angle formed between the expanded sheets. The entrance angle occurs at the line where the surfaces of the split forming fixture engage which is usually the inner surface of the flange around the perimeter of the expanded structure.

BRIEF DESCRIPTION OF THE DRAWINGS

FIG. 1 is a typical four sheet process of the Prior Art having vertical perimeter walls and showing the entrance angle at the flange formed at the split in the forming fixture;

FIG. 2 is the same section as FIG. 1 except it shows the result of using the method of this invention;

FIG. 3 is the section of FIG. 2 after the flange has been removed;

FIG. 4 shows the improved method of this invention on a two sheet process;

DETAILED DESCRIPTION OF THE PREFERRED EMBODIMENT

Figure 5:
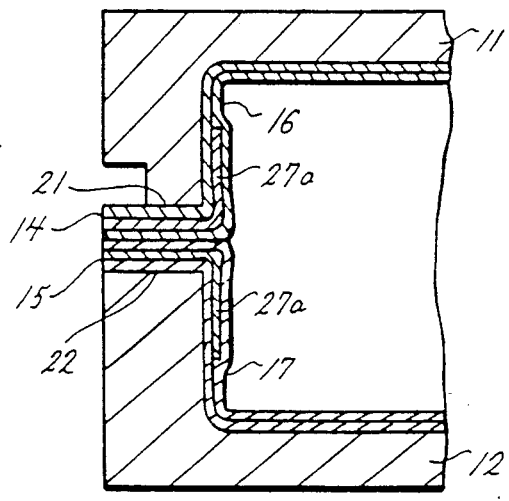
FIG. 5 is an alternate embodiment of the doubler of this invention shown in FIG. 2.

FIG. 1 shows a four sheet structure, as taught by Hayase et al, previously incorporated by reference, wherein four sheets are expanded between upper and lower halves 11 and 12, respectively, of the forming fixture. Two outer sheets 14 and 15 are expanded first to contact the inside surfaces of the forming fixture and then the inner sheets 16 and 17 are expanded to engage the inner surface of the outer sheets 14 and 15. It is shown with a web 18 which is formed because of a series of intermittent spot wells shown at 20. While the sheets are shown separately and of course, are separate initially, after the expansion and diffusion bonding there is no demarcation between one sheet and another. In the structure shown in FIG. 1 all four of the sheets are retained between the two engaging surfaces 21 of the upper fixture and 22 of the lower fixture. There are many alternate possibilities of how the end pieces of the structure are formed, however, any of the sheets to be expanded must be restrained by the upper and lower half of the fixture.

During the forming operation an entrance angle 24 is formed between the two inner surfaces 16 and 17 where they bend around the fixture to form the vertical wall 25. It is this entrance angle 24 which presents the problem. As can be plainly seen if the part is removed from the fixture and the flange trimmed flush with the outside wall 26 the structure may separate because of a void formed by the angle 24. The object of this invention is to make certain that this void does not occur.

FIG. 2 shows a structure quite similar to that of FIG. 1 except that the engaging upper and lower surface of the fixture 21a is shown relieved at 23 to increase pressure, the surfaces are sloped inwardly and doubler material 27 is inserted between the inner surface of the two inside sheets 16 and 17. The location of the doubler or the slope is not critical, however, two things are critical i.e. there must be sufficient material to be upset forged to fill the noted void and sufficient forging pressure. A single doubler may be used between the inner sheets as shown in FIG. 2 or two doublers may be used, one each between the inner and outer sheets as shown in FIG. 5. In fact the two doublers, as shown in FIG. 5, is the preferred embodiment for the four sheet process because the inner sheets are welded together in a predetermined pattern to establish the webs 18 and it eases the task to place the doublers 27a between the inner and outer sheets. Also, while the surfaces of the fixture 21 and 22 may be square to the vertical walls of the fixture if the surfaces are canted or the wedge tapered a force is created forcing the upset forged material into the cavity to be filled. Obviously, these embodiments minimize the amount of material to be forged as nothing is gained by forging material out at any undesired location. The doubler material, of course, must be one that is diffusion bondable to the inner sheets 16 and 17 and is usually selected as the same material.

The doublers may be placed between the outside surface of the sheets and the surface of the fixture 21 or 22, however, this location is outside the envelope to be formed and the doubler will not bond to the surface of the sheets. This occurs because that surface is not in a totally controlled environment and the surface oxidizes while the sheets inside the envelopes to be expanded are only exposed to an inert gas. The result is that the doubler at this location functions like a modification to the surface of the fixture since it does not bond to the formed sheets and it does not provide any extra material to be forged.

After superplastically forming the structure, pressure is applied between the two surfaces 21a and 22a, usually by a hydraulic press, so as to upset forge the doubler 27 and thereby fill the void formed by the entrance angle 24 in FIG. 1.

FIG. 3 shows the structure formed in FIG. 2 with the flange removed flush with the outer wall 26. It is clear that there is no void at this joint.

FIG. 4 shows an alternative embodiment of the fixture 11 and 12 where the upper fixture half 11 has a step in the upper engaging surface of the fixture 21a and the step 30 functions as a stop to limit the amount of forging that occurs between the two surfaces 21a and 22a which controls the amount of upset forging of the doubler 27. As a practical matter stops are used on almost all fixtures and is the preferred embodiment. Incidentally, this figure shows a two sheet structure.

FIG. 5 shows alternate doublers 27a located between the first and second upper sheets and the first and second lower sheets which is the preferred embodiment in the four sheet process It produces the same upset forging but the actual material that fills the void is contributed by the inner sheets 16 and 17 as a result of the doublers.

Figure 6:
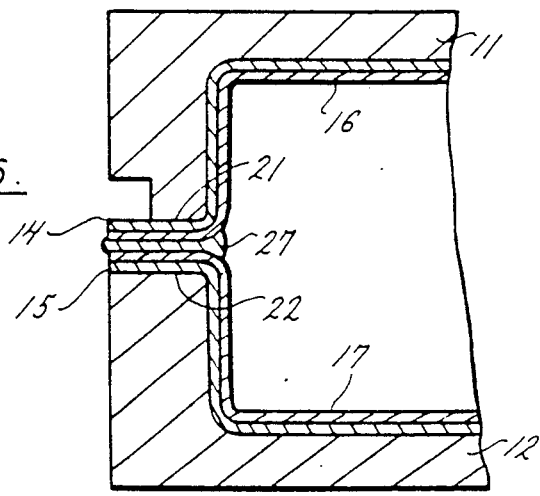
FIG. 6 is an alternate embodiment of FIG. 2 with the doubler shown non-tapered.

FIG. 6 is another alternate embodiment showing the upper and lower engaging surfaces of the fixture 21 and 22 as flat or squared at the vertical surface and the doubler 27 is also flat.

Figure 7:
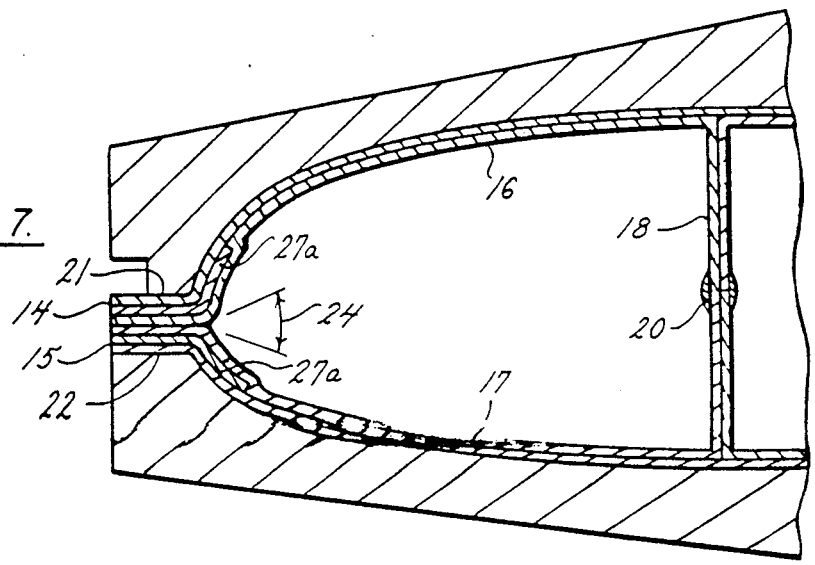
FIG. 7 shows a section of a sandwich structure where the perimeter walls are other than vertical.

Finally, FIG. 7 shows a structure formed with a smaller entrance angle 24 because the outer surfaces are not vertical but the same problem occurs depending on where the flange is trimmed. For instance, if you wanted to superplastically form a sandwich structure as the leading edge of an airplane wing the same problem occurs as the leading edge needs to be rounded as shown in FIG. 7.

It should now be reasonably clear that forging is critical to this invention; however, there must be sufficient material to forge and this is best accomplished by the insertion of at least one doubler between any of the sheets being superplastically formed and applying suitable forging pressures. The force applied through the engaging surfaces of the split shaping fixture forges the material and serves to fill the void due to the two opposing radiuses of the inner sheets which has been identified as the entrance angle.

What is claimed is:

1. A super plastically formed and diffusion bonded structure having at least two sheets expanded opposite each other so as to form a flange around the perimeter of the structure comprising an upset forged portion at the entrance angle formed on the inside surface at the intersection of said at least two sheets opposite said flange so as to fill said entrance angle wherein the upset forged portions additionally include at least one doubler strip.

2. A super plastically formed and diffusion bonded structure having at least two sheets expanded opposite each other so as to form a flange around the perimeter of the structure comprising:
   a first sheet forming an angle having a first leg and a second leg with a first radius between said first and second legs;
   a second sheet forming an angle having a first leg and a second leg with a second radius between said first and second legs; and
   at least one doubler diffusion bonded between any of said at least two sheets in the portion of said first leg when said at least two sheets are further oriented so that said second legs of said first and second sheets run in generally opposing directions and said portion between said first and second radius terminate in an upset forged portion extending beyond and bridging between said radius portions of said first and second sheets whereby when said first legs are removed from said structure to produce a smooth surface between said second legs said upset forged portion maintains structural continuity between said second legs of said first and second sheets.

3. The structure of claim 2 wherein said at least one doubler is located between said first leg of said first sheet and said first leg of said second sheet.

4. The structure of claim 2 wherein said at least two sheets are four sheets and said at least one doubler are two doublers located on the outside of said first sheet and the outside of said second sheet.

5. A method of superplastic forming and diffusion bonding a metallic structure in a limiting fixture having opposing upper and lower surfaces and defining a cavity therebetween, comprising:
- stacking at least two worksheets in facing contact with each other;
- inserting at least one doubler between any of said at least two worksheets, said doubler having an outside and inside perimeter similar to the outside and inside perimeter of said upper and lower surfaces of said limiting fixture;
- sealing said worksheets and said doubler near said outside perimeter while providing means for the admission of pressurized gas between said sealed worksheets producing at least one inflatable pair of worksheets;
- positioning said at least one pair of worksheets and said at least one doubler over said cavity and between said upper and lower surfaces of said limiting fixture;
- heating said worksheets to a temperature suitable for superplastic forming and applying gas pressure at said means for the admission of pressurized gas, producing a differential pressure between the inside and outside of said at least one inflatable pair of worksheets with said at least one doubler, causing said worksheets to expand, forming a cavity; and
- applying force at said opposing upper and lower surfaces of said limiting fixture to forge the portions of said at least two sheets and said at least one doubler located between said opposing upper and lower surfaces of said limiting fixture so as to extrude into said expanded worksheet cavity at the juncture of said innermost worksheets to substantially fill the reentrant angle that would otherwise occur at the juncture.

6. The method, as set out in claim 5, wherein the step of inserting at least one doubler between any of said worksheets includes tapering said doubler with the thick end toward said inner perimeter whereby assisting the forging in the proper direction.

7. The method, as set out in claim 5, further comprising the additional step of limiting the amount of forging of said portions of said at least one doubler and said at least two sheets located between said opposing upper and lower surfaces of said limiting fixture by providing a stop to limit the travel between said upper and lower surfaces of said limiting fixture whereby controlling the amount of forging.

8. The method of claim 5 wherein the step of inserting said doubler between any of said worksheets includes making said inside perimeter of said at least one doubler smaller than said inside perimeter of said upper and lower surfaces of said limiting fixture so as to provide an overhang of said doubler at said inside perimeter.

9. The method, as set out in claim 6, further comprising the additional step of limiting the amount of said forging by providing a stop to limit the travel between said upper and lower surfaces of said limiting fixture whereby controlling the amount of forging of said doubler.

10. The method of claim 6 wherein the step of inserting said at least one doubler between any of said worksheets includes making said inside perimeter of said doubler smaller than said inside perimeter of said upper and lower surfaces of said limiting fixture so as to provide an overhang of said doubler at said inside perimeter.

11. The method of claim 7 wherein the step of inserting said at least one doubler between any of said worksheets includes making said inside perimeter of said doubler smaller than said inside perimeter of said upper and lower surfaces of said limiting fixture so as to provide an overhang of said doubler at said inside perimeter.

12. The method of claim 9 wherein the step of inserting said at least one doubler between any of said worksheets includes making said inside perimeter of said doubler smaller than said inside perimeter of said upper and lower surfaces of said limiting fixture so as to provide an overhang of said doubler at said inside perimeter.

13. A method of superplastic forming and diffusion bonding a metallic structure in a limiting fixture having opposing upper and lower surfaces so as to form an outer and inner perimeter and having at least one of said surfaces canted so as to provide a greater gap at said inner perimeter than said outer perimeter when said surfaces are engaged, and forming a cavity between said upper and lower surfaces, comprising:
- stacking at least two worksheets in facing contact with each other;
- inserting at least one doubler between any of said at least two worksheets, said doubler having an outside and inside perimeter similar to the outside and inside perimeter of said upper and lower surfaces of said limiting fixture;
- sealing said worksheets and said doubler near said outside perimeter while providing means for the admission of pressurized gas between said sealed worksheets producing at least one inflatable pair of worksheets;
- positioning said at least one pair of worksheets and said at least one doubler over said cavity and between said upper and lower surfaces of said limiting fixture;
- heating said worksheets to a temperature suitable for superplastic forming and applying gas pressure at said means for the admission of pressurized gas, producing a differential pressure between the inside and outside of said at least one inflatable pair of worksheets with said at least one doubler, causing said worksheets to expand, forming a cavity; and
- applying force at said opposing upper and lower surfaces of said limiting fixture to forge the portions of said at least two sheets and said at least one doubler located between said opposing upper and lower surfaces of said limiting fixture so as to extrude into said expanded worksheet cavity at the juncture of said innermost worksheets to substantially fill the reentrant angle that would otherwise occur at the juncture.

* * * * *